United States Patent
Schultheis et al.

(10) Patent No.: US 6,884,471 B2
(45) Date of Patent: Apr. 26, 2005

(54) METHOD OF PRODUCING A LIGHT-SCATTERING LAYER ON A GLASS OR GLASS CERAMIC BODY

(75) Inventors: Bernd Schultheis, Schwabenheim an der Selz (DE); Cora Krause, Burrweiler (DE); Karsten Wermbter, Budenheim (DE)

(73) Assignee: Schott AG, Mainz (DE)

( * ) Notice: Subject to any disclaimer, the term of this patent is extended or adjusted under 35 U.S.C. 154(b) by 0 days.

(21) Appl. No.: 10/702,328

(22) Filed: Nov. 6, 2003

(65) Prior Publication Data

US 2004/0115352 A1 Jun. 17, 2004

Related U.S. Application Data

(63) Continuation of application No. PCT/EP02/03269, filed on Mar. 22, 2002.

(30) Foreign Application Priority Data

May 10, 2001 (DE) .......................... 101 22 718

(51) Int. Cl.[7] .................. C23C 4/02; C23C 4/10
(52) U.S. Cl. .................. 427/448; 427/446; 427/452; 427/453
(58) Field of Search .................. 427/448, 446, 427/453, 452

(56) References Cited

U.S. PATENT DOCUMENTS

| 3,419,414 A | * 12/1968 | Marks ................. 428/601 |
| 4,277,522 A | * 7/1981 | Dorfeld ................. 427/292 |
| 5,300,349 A | 4/1994 | Roche et al. |
| 6,037,572 A | 3/2000 | Coates et al. |
| 6,160,345 A | * 12/2000 | Tanaka et al. .............. 313/489 |

FOREIGN PATENT DOCUMENTS

| DE | 40 13 253 A1 | 5/1991 |
| DE | 40 13 758 A1 | 5/1991 |
| DE | 40 31 489 C2 | 4/1992 |
| DE | 198 22 841 A1 | 11/1999 |
| GB | 1 547 530 | 6/1979 |
| JP | 03-120349 | * 5/1991 |

OTHER PUBLICATIONS

Wolfgang Gráf, "Plasmaspritzen auf Glas", Silikattechnik 32 (1981), vol. 10.

Harmathy Paul F. et al.; "Flammspritzen Ein Modernes Beschichtungsverfahren"; pp. 52–55.

* cited by examiner

Primary Examiner—Katherine Bareford
(74) Attorney, Agent, or Firm—Harness, Dickey & Pierce, P.L.C.

(57) ABSTRACT

The invention discloses a method of producing a light-scattering layer on a transparent body, in particular consisting of glass or a glass ceramic. The light-scattering layer is produced by thermal spraying a material such as aluminum oxide, titanium oxide etc. onto a surface of the preheated body with a maximum layer thickness of 100 micrometers. The method is particularly suited for preparing light-scattering layers on glass ceramic cooktops.

20 Claims, 1 Drawing Sheet

METHOD OF PRODUCING A LIGHT-SCATTERING LAYER ON A GLASS OR GLASS CERAMIC BODY

RELATED APPLICATIONS

This is a continuation application of International Patent Application PCT/EP02/03269, filed on Mar. 22, 2002 and published in German, and claiming priority of German patent application 101 22 718.3 filed on May 10, 2001.

BACKGROUND OF THE INVENTION

The invention relates to a light-scattering layer on a transparent body, in particular consisting of a glass or a glass ceramic, as well to a method producing such a layer. More particularly, the invention relates to a method of preparing a light-scattering layer on a glass ceramic cooktop.

It is known to apply organic colors onto glass ceramic cooktops by printing the colors onto a nap pattern on the lower side of the glass ceramic cooktop. This coating shall avoid a lateral emerging of light, in particular when halogen irradiation heaters are utilized. To this end, usually a black paint is utilized which is temperature-resistant only to a maximum of 250° C. (permanent resistance) or to about 350° C. (short-time resistance), respectively. Therefore, in any event it is necessary to spare the hot region above the heating elements from the Ceramic colors, such as commonly utilized for the decoration of the top surfaces of glass ceramic cooktops cannot be used on the lower side of a glass ceramic cooktop, since they reduce the mechanical stability during baking such that a sufficient impact resistance is not provided any more. Herein the impact resistance deteriorates to values below 0.5 Joule.

From U.S. Pat. No. 6,037,572 it is basically known to apply ceramic particles by thermal spraying onto a surface of a glass ceramic.

However, the glass ceramic layer produced in this way is only intended as an insulation layer in glass ceramic cooktops that are provided with a contact heater on the lower side of the glass ceramic plate. Such an insulation layer is necessary when using contact heaters, since the electric resistance of a glass ceramic decreases with increasing temperature (NTC characteristic). An insulation layer manufactured in this way thus comprises a large layer thickness on the order of several hundred micrometers and is optimized with respect to its insulating characteristics. In addition, there is an adhesion problem when applying ceramic particles by thermal spraying onto a glass or a glass ceramic surface. Namely, it has been found that the common pretreatment of the surface to be coated by surface roughening blasting is not possible, since thereby the mechanical stability of the glass or glass ceramic surface is impaired.

SUMMARY OF THE INVENTION

Thus it is a first object of the invention to provide a method of producing a light-scattering layer on a material consisting of glass or a glass ceramic.

It is a second object of the invention to provide a method of producing a glass ceramic cooktop comprising a light-scattering layer at a surface thereof.

It is a third object of the invention to provide a method of producing a light-scattering layer on a material consisting of glass or a glass ceramic offering a good mechanical and thermal stability.

It is a forth object of the invention to provide a method of producing a light-scattering layer that is simple and cost-effective.

It is a further object of the invention to provide a method of producing a light-scattering layer that offers flexibility in the adjustment of optical characteristics with respect to various requirements.

It is still a further object of the invention to provide a method of producing a light-scattering layer that can be effected in an energy-efficient way.

These and other objects of the invention are solved by a method comprising providing a transparent body consisting of a glass or a glass ceramic, preheating the body to a temperature between 200 and 450° C., but below the glass transition temperature and applying a layer of a maximum thickness of 100 micrometers to a surface thereof by thermal spraying.

The object of the invention is completely solved in this way.

By limiting the layer thickness to a maximum of about 100 μm adhesion problems are avoided, counter-acting a possible delamination of the layer.

According to the invention by preheating the body to be coated, a particularly good adhesion of the particles to the surface of glass or glass ceramic can be reached without the necessity of prior surface roughening by sand blasting.

By contrast to the ceramic layers applied by thermal spraying which serve as surface insulating layers in the manufacture of directly heatable ceramic cooktops, a large variety of materials can be utilized for producing the light-scattering layer, wherein only it should be tried to reach a certain matching of the coefficient of thermal expansion to the expansion characteristics of the body to be coated (coefficient of thermal expansion of glass ceramic close to zero).

Thus, a large variety of ceramic materials can be utilized which includes, among others, aluminum oxide, titanium oxide, boron nitride, zirconium oxide, silicon nitride or mixtures thereof.

In particular, aluminum oxide and titanium oxide offer a particularly good adhesion of the applied light-scattering layer to the surface of the coated body. While titanium oxide seems to be particularly suited for the production of opaque layers, since titanium oxide has a white color, aluminum oxide is suitable for the production of translucent light-scattering layers, in case a small layer thickness is selected, as well as the production of opaque layers, in case a larger layer thickness is selected.

For producing an opaque light-scattering layer, layer thicknesses of at least 20 μm, in particular of about 30 to 60 μm, in particular of about 40 to 50 μm are suitable.

However, if a translucent light-scattering layer shall be produced, then the layer thickness should, preferably, be smaller than 20 μm.

Depending on the desired coloring and the other optical characteristics of the light-scattering layer also colored particles may be utilized for its production, such as iron oxide particles, or colored particles may only be admixed thereto. Thus for instance color pigments may be admixed to aluminum oxide or titanium oxide which offers a particularly goods adhesion to a glass or glass ceramic surface.

In addition, powder of ground glass or ground glass ceramic can be admixed to the particles, as long as the resulting mixture is still thermally sprayable. Preferably, herein the powder may also be prepared from recycling material.

To reach a good adhesion of the light-scattering layer to the surface of the coated body, prior to the coating the body is heated to a temperature of at least 100° C., preferably to a temperature of at least 200° C., in particular to a temperature of about 200 to 450° C., before the particles are applied by spraying. In particular with glass ceramics, such as Ceran® available from Schott, in this temperature region a particularly good adhesion of the sprayed glass ceramic layer can be ensured.

Preferably, the body is preheated to a temperature below the glass transition temperature, since beyond that the form stability is impaired.

For preheating the body to be coated before spraying of the particles, a prior annealing process can be utilized which must be performed anyway during manufacture of the body.

In this way a particularly energy saving process is reached.

Thus, for instance, spraying of the particles may follow directly onto a prior annealing treatment in a crystallization furnace during manufacture of a glass ceramic or may follow an annealing process in a pre-stressing furnace during manufacture of a pre-stressed glass sheet. In addition, it is conceivable to utilize the process of hot forming during the manufacture of a base glass for a glass ceramic (GK green glass), or to utilize the floating process during glass sheet manufacture (e.g. Borofloat® glass). Herein the exit temperatures usually are in a region between 450 and 700° C.

As far as only parts of the surface shall be coated with the light-scattering layer, other parts not to be coated can be covered a masking process before the ceramic particles are applied by spraying.

Preferably, for thermal spraying a plasma spraying process or possibly a flame spraying process is utilized.

Depending on the process flow and on the spraying parameters utilized, the characteristics of the light-scattering layer produced in this way can be influenced. During impact the particles are deformed to lens-shaped splats due to the high kinetic energy. Commonly, the particle size is in a region between about 5 and 30 μm, wherein the median particle size is usually in the range between 1 and 20 μm. However, the particle size can additionally be influenced by the selected operating parameters during this coating process.

Small layer thicknesses on the order of about up to 10 μm can be obtained during a single spraying operation. Larger layer thicknesses beyond that usually are applied in several layers.

It will be understood that the above-mentioned and following features of the invention are not limited to the given combinations, but are applicable in other combinations or taken alone without departing from the scope of the invention.

Further features and advantages of the invention will become apparent from the following description of preferred embodiments taken in conjunction with the drawings.

DETAILED DESCRIPTION OF THE PREFERRED EMBODIMENTS

Figure 1:
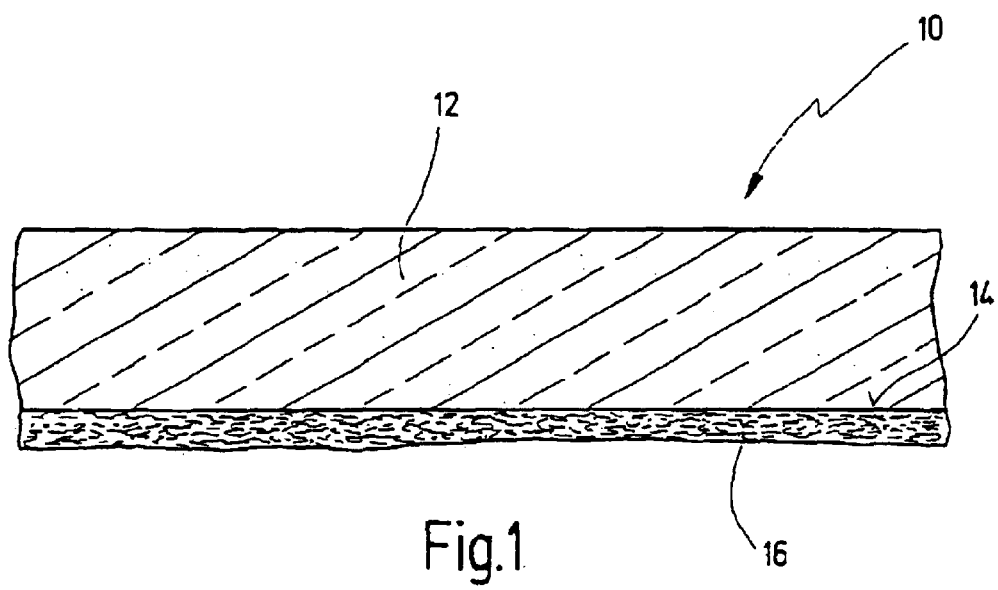
In FIG. 1 a portion of a plate-shaped body consisting of a glass ceramic and comprising a light-scattering layer according to the invention is shown in cross-sectional view.

In FIG. 1 a transparent body 12 comprises a thin plasma sprayed coating 16 consisting of $Al_2O_3$ at one of its surfaces 14. The body manufactured in this way is designated in total with numeral 10.

It should be understood that the representation according to FIG. 1 is merely of exemplary nature and is, in particular, not drawn to scale.

The transparent body is a cooktop consisting of the lithium-aluminosilicate glass ceramic manufactured by the company Schott Glas and marketed under the trademark Ceran®. While the thickness of the plate-shaped body or sheet 12 is usually at least several millimeters (typically about 4 to 6 millimeters), the thickness of the coating 16 applied by thermal spraying is usually smaller than 100 μm.

The layer 16 consists of a ceramic material, e.g. of aluminum oxide, titanium oxide, boron nitride, zirconium oxide, silicon nitride or mixtures thereof. If desired, additional color pigments, such as $Fe_2O_3$ particles, may be added to these materials.

As a consequence of the high kinetic energy during the coating process these applied particles are deformed lens-like, thus yielding so-called splats.

Since the layer 16 thus consists of a plurality of individual particles, this layer acts as a light-scattering layer. The particle sizes usually are in a range of about 1 to 20 μm, wherein typically a median of about 5 μm results, wherein 90% of the particles may have a diameter of smaller than 30 μm.

However, depending on the selected starting material and on the selected process parameters during thermal spraying the particle sizes can be influenced.

If the light-scattering layer 16 shall be opaque, then it is applied with a layer thickness of more than 20 μm, typically with a layer thickness of about 40 to 50 μm. However, if a translucent light-scattering layer 16 is desired, then a layer thickness of less than 20 μm, e.g. about 10 to 15 μm, is preferred. Naturally, the opaqueness or the translucency, respectively, of the layer 16 are in addition influenced by the type of the selected layer material.

While a layer consisting of aluminum oxide is translucent also at relatively small layer thicknesses, e.g. a layer consisting of titanium oxide is more opaque, since titanium oxide offers a whitish color by nature.

A good adhesion of the light-scattering layer 16 to the surface 14 of the body 12 is ensured by several measures.

On the one hand the coefficients of thermal expansion of the material of which the light-scattering layer 16 consists, and the material of which the body 12 consists, should not differ to a large extent, to possibly avoid thermally induced stresses.

In particular, if the body 12 consists of a glass ceramic, which has a coefficient of expansion close to zero, then the light-scattering layer 16 should be produced of a material the coefficient of thermal expansion of which is relatively small.

It has been found that in particular aluminum oxide and titanium oxide are suitable with regard to the coefficient of thermal expansion and also offer a good adhesion to the surface of glasses and glass ceramics due to their chemical characteristics.

In addition, the adhesion of the light-scattering layer 16 and the long-term stability is considerably enhanced even at thermal cycling, if the body 12 is pre-heated before the treatment, wherein for the coating of glass ceramic in particular temperatures in a region between about 200 up to 450° C. have been found to be particularly advantageous.

Finally, the small layer thickness of the light-scattering layer 16 facilitates a good adhesion, while at larger layer thicknesses thermally induced stresses have a considerably more pronounced effect due to the differences between the coefficients between thermal expansion, thus in particular fracturing may occur or delaminations in the rim region of the coating.

Figure 2:
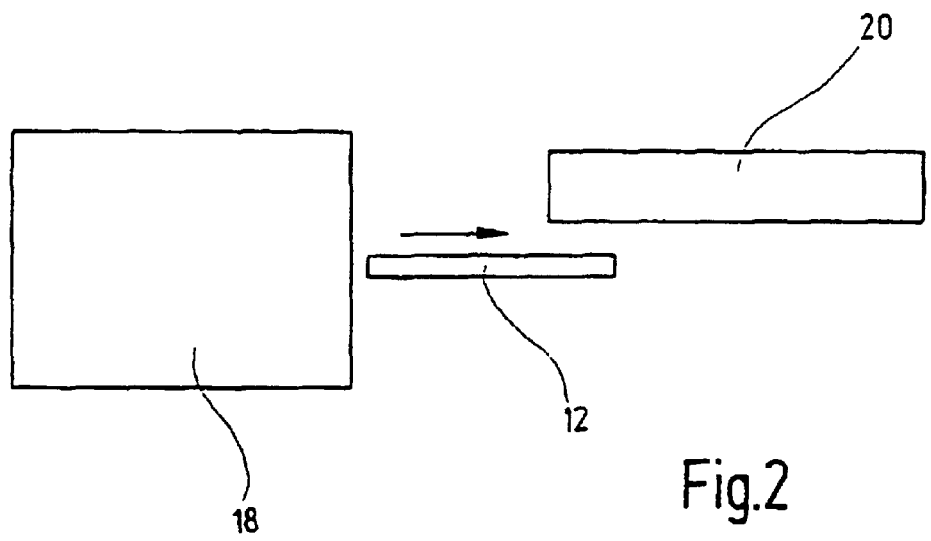
FIG. 2 is a schematic diagram of the manufacturing process of the plate-shaped body 10 shown in FIG. 1.

Preferably, the coating process follows immediately to a prior annealing process during manufacture of the body 12 so that an operation as energy saving as possible is ensured. As shown schematically in FIG. 2, thus for instance the coating of a glass ceramic plate of Ceran® by a plasma burner 20 could immediately follow thermal treatment of the body 12 in a crystallization furnace 18 in which the partial crystallization of the lithium base glass is reached during manufacture of the glass ceramic.

It will be understood that the thermal treatment steps of various manufacturing processes can be utilized in an energy saving way by allowing an immediately following coating process.

There exist various areas of applications, e.g. as transparent, non-colored glass ceramic cooktops having a light-scattering layer on their lower side, appearing white or colored, or transparent colored glass ceramic cooktops of Ceran® having a light-scattering layer on their lower side, or pre-stressed lime soda glass which e.g. may be utilized for operating panels, stove windows having regions of lower transparency, chimney viewing sheets of glass ceramic having regions of smaller transparency or hearth viewing sheets of glass ceramic.

If desired, the coating may also be effected only on selected regions. To this end, prior to applying the coating, the respective regions to be excluded can be masked by means of a protective coating in a masking process, the protective coating being removed again after thermal spraying.

What is claimed is:

1. A method of producing a light-scattering layer on a glass ceramic cooktop, comprising the following steps:
   providing a transparent glass ceramic cooktop having a certain glass transition temperature;
   masking certain portions of a surface of said glass ceramic cooktop by a masking process;
   preheating said glass ceramic cooktop to a temperature between 200 to 450° C., but below said glass transition temperature; and
   applying a light-scattering layer onto said surface of said preheated glass ceramic cooktop by thermal spraying of a material comprising at least one material selected from the group formed by aluminum oxide, titanium oxide, boron nitride, zirconium oxide, silicon nitride and mixtures thereof with a maximum layer thickness of 100 $\mu$m, wherein said light-scattering layer is the uppermost layer on the finished ceramic cookup.

2. The method of claim 1, wherein said light-scattering layer is prepared from a mixture further comprising a material selected from the group formed by a glass and a glass ceramic.

3. The method of claim 1, wherein said light-scattering layer is prepared from a mixture further comprising color pigments.

4. The method of claim 1, wherein said light-scattering layer is prepared from a mixture further comprising recycled material.

5. The method of claim 1, wherein said thermal spraying step is effected after completing a thermal treatment step during manufacture of said glass ceramic cooktop.

6. A method for producing a light-scattering layer on a transparent body, comprising the following steps:
   providing a transparent body consisting of a material selected from the group formed by a glass and a glass ceramic;
   preheating the transparent body to a temperature between 200 to 450° C., but below the glass transition temperature of said body; and
   applying a light-scattering layer onto a surface of said preheated body by thermal spraying with a maximum layer thickness of 100 $\mu$m, wherein said light-scattering layer is the uppermost layer on the finished transparent body.

7. The method of claim 6, wherein said light-scattering layer is prepared from a material comprising at least one component selected from the group formed by aluminum oxide, titanium oxide, boron nitride, zirconium oxide, silicon nitride and mixtures thereof.

8. The method of claim 6, wherein said light-scattering layer is prepared from a mixture comprising a material selected from the group formed by a glass and a glass ceramic.

9. The method of claim 8, wherein said light-scattering layer is prepared from a mixture of particles comprising particles selected from the group formed ground glass and ground glass ceramic.

10. The method of claim 6, wherein said light-scattering layer is prepared from a mixture comprising color pigments.

11. The method of claim 6, wherein said light-scattering layer is prepared from a mixture comprising recycled material.

12. The method of claim 6, wherein said light-scattering layer is applied with a layer thickness of at least 20 $\mu$m for producing an opaque layer.

13. The method of claim 12, wherein said light-scattering layer is applied with a layer thickness of 30 to 60 $\mu$m for producing an opaque layer.

14. The method of claim 13, wherein said light-scattering layer is applied with a layer thickness of 40 to 50 $\mu$m for producing an opaque layer.

15. The method of claim 6, wherein said light-scattering layer is applied with a layer thickness of less than 20 $\mu$m for producing a translucent layer.

16. The method of claim 6, wherein said thermal spraying step is effected after completing a thermal treatment step during manufacture of said body.

17. The method of claim 6, wherein portions of a surface of said body are covered by a masking process prior to applying said light-scattering layer by thermal spraying.

18. The method of claim 6, wherein said transparent body comprises a float glass sheet.

19. The method of claim 6, wherein said transparent body comprises a material selected from the group formed by a lime soda glass, a borosilicate glass and an aluminosilicate glass.

20. A method of producing a light-scattering layer on a glass ceramic cooktop, comprising the following steps:
   providing a transparent glass ceramic cooktop having a certain glass transition temperature;
   preheating said glass ceramic cooktop to a temperature between 200 to 450° C., but below said glass transition temperature; and
   applying a light-scattering layer onto said surface of said preheated glass ceramic cooktop by thermal spraying with a maximum layer thickness of 100 $\mu$m, wherein said light-scattering layer is the uppermost layer on the finished ceramic cooktop.

* * * * *